(12) United States Patent
Corzani et al.

(10) Patent No.: US 7,833,515 B2
(45) Date of Patent: *Nov. 16, 2010

(54) POLYMERIC COMPOSITIONS FOR SUSTAINED RELEASE OF VOLATILE MATERIALS

(75) Inventors: Italo Corzani, Chieti (IT); Calum Macbeath, Francavilla al Mare (IT); Manuel Mariani, Montesilvano (IT)

(73) Assignee: Procter & Gamble Company, Cincinnati, OH (US)

( * ) Notice: Subject to any disclaimer, the term of this patent is extended or adjusted under 35 U.S.C. 154(b) by 157 days.

This patent is subject to a terminal disclaimer.

(21) Appl. No.: 10/987,630

(22) Filed: Nov. 12, 2004

(65) Prior Publication Data

US 2005/0106200 A1    May 19, 2005

(30) Foreign Application Priority Data

Nov. 14, 2003   (EP)   .................... 03026234

(51) Int. Cl.
*A61K 8/72* (2006.01)
*A61K 8/73* (2006.01)
*C08G 18/30* (2006.01)

(52) U.S. Cl. .................... 424/70.11; 424/70.13; 528/76
(58) Field of Classification Search .............. 424/70.13, 424/70.11; 528/76
See application file for complete search history.

(56) References Cited

U.S. PATENT DOCUMENTS

| | | | |
|---|---|---|---|
| 2,168,892 A | 11/1952 | Locks et al. |
| 3,174,654 A | 3/1965 | Reiner |
| 3,412,907 A | 11/1968 | Faso |
| 3,876,762 A | 4/1975 | Rabussier et al. |
| 3,969,280 A | 7/1976 | Sayce et al. |
| 4,515,909 A | 5/1985 | Sawano et al. |
| 4,552,693 A | 11/1985 | Hussain et al. |
| 4,618,629 A | 10/1986 | Buchanan |
| 4,734,278 A | 3/1988 | Pougalan et al. |
| 4,761,437 A | 8/1988 | Christie |
| 4,858,831 A | 8/1989 | Spector |
| 4,865,759 A | 9/1989 | Coyne et al. |
| 4,904,524 A | 2/1990 | Yoh |
| 5,698,166 A | 12/1997 | Vick et al. |
| 5,861,128 A | 1/1999 | Vick et al. |
| 6,111,055 A | 8/2000 | Berger et al. |
| 6,153,210 A | 11/2000 | Roberts et al. |
| 6,291,371 B1 | 9/2001 | Shefer et al. |
| 6,375,966 B1 | 4/2002 | Maleeny et al. |
| 6,875,245 B2 | 4/2005 | Pavlin |
| 2002/0037385 A1 | 3/2002 | Pignot et al. |
| 2002/0103086 A1 | 8/2002 | Asrar et al. |
| 2003/0105183 A1 | 6/2003 | Sharak |
| 2003/0195272 A1 | 10/2003 | Harwell et al. |
| 2004/0018278 A1 | 1/2004 | Popplewell et al. |
| 2004/0018293 A1 | 1/2004 | Popplewell et al. |
| 2004/0105836 A1* | 6/2004 | Seipel et al. |
| 2004/0191200 A1 | 9/2004 | Lezer et al. |
| 2004/0241195 A1 | 12/2004 | Tollens |
| 2005/0148479 A1 | 7/2005 | Barthel et al. |
| 2005/0150154 A1 | 7/2005 | Maat |
| 2005/0202988 A1 | 9/2005 | De Belder et al. |
| 2005/0272878 A1 | 12/2005 | Corzani et al. |
| 2006/0099168 A1 | 5/2006 | Corzani et al. |
| 2007/0129476 A1 | 6/2007 | Macbeath et al. |

FOREIGN PATENT DOCUMENTS

| | | |
|---|---|---|
| DE | 3630319 * | 4/1988 |
| DE | 10118268 * | 4/2001 |
| DE | 10237066 A1 | 2/2004 |
| EP | 1 153 169 | 2/2004 |
| GB | 1 558 960 | 1/1980 |
| GB | 2 286 531 A | 8/1995 |
| GB | 2 372 450 A | 8/2002 |
| JP | 59-152151 A2 | 8/1984 |
| JP | 60-147443 A2 | 8/1985 |
| JP | 08-283484 A2 | 10/1996 |
| WO | WO97/26020 A1 | 7/1997 |
| WO | WO 02/066084 A1 | 8/2002 |

OTHER PUBLICATIONS

U.S. Appl. No. 11/147,702, filed Jun. 8, 2005, I. Corzani et al.
U.S. Appl. No. 11/268,334, filed Nov. 7, 2005, I. Corzani et al.
U.S. Appl. No. 11/604,454, filed Nov. 27, 2006, C. Macbeath, et al.

* cited by examiner

*Primary Examiner*—Carlos A Azpuru
(74) *Attorney, Agent, or Firm*—John M Howell; Jay A Krebs; Peter D Meyer

(57) ABSTRACT

A polymeric composition comprising a copolymer obtained from at least one monomer comprising an ether group and at least one monomer not comprising an ether group, a compatible plasticizer and a volatile material is able to provide sustained delivery of the volatile material over a long period of time. Additionally, if the volatile material is a composition formed by several components of different volatility, the compositions of the present invention is able to provide a uniform release of all components of the volatile material.

8 Claims, No Drawings

POLYMERIC COMPOSITIONS FOR SUSTAINED RELEASE OF VOLATILE MATERIALS

FIELD OF THE INVENTION

The present invention relates to plasticized polymeric compositions which are able to incorporate and sustainedly release volatile materials (e.g. perfumes) based on copolymers obtained from at least one monomer comprising an ether group and at least one monomer not comprising an ether group. In particular, if the volatile material is a composition formed by several components of different volatility, the compositions of the present invention allow a uniform release of all components of the volatile material over a long period of time. In the case of perfumes, which are typically composed of many components of different volatility, the present invention, avoiding separation of the components based on their different volatilities, allows the sustained delivery of the full perfume character for a long time. The compositions of the present invention can find a variety of applications wherein a prolonged delivery of a volatile material in an environment is desired such as air freshening devices, deodorants, scented objects, insecticides etc.

BACKGROUND OF THE INVENTION

Polymeric compositions which are able to absorb and release volatile ingredients are well known in the art, in particular concerning perfume delivery.

GB1558960 from Nagae, describes a perfume emitting PVC film to be used in umbrellas.

U.S. Pat. No. 4,618,629 from T. Burnett & Co, Inc describes fragrance-emitting polyurethane foams which have a particulate fragrance-carrying resin incorporated in them. The resin can be selected from a list of polymers (polyolefins, polyester, PVC and similar, polyamides, cellulose polymers).

A common use of polymeric compositions for perfume delivery comprises for example air freshening devices. These are typically in the form of aqueous gels usually obtained from crosslinked polysaccharide polymers (starches, alginates or CMC) such as those described in GB2286531 from Kelco, U.S. Pat. No. 3,969,280 from Johnson & Johnson.

While these and other documents claim to provide long lasting delivery of volatile materials, they are still far from being fully satisfactory for a number of reasons.

Firstly, these polymeric compositions can normally incorporate and release a very limited amount of volatile material, in most cases not exceeding 10% of the total weight of the compositions.

Secondly these polymeric compositions are not able to release uniformly different components of the volatile material which have different volatilities. Given, for example, a perfume which can have more than 10 different components, the more volatile components will be released first and after some time only the less volatile notes would be perceptible, therefore the full perfume character would never be perceived by the user. Actually, the above mentioned polymeric compositions are commonly used to deliver simple perfumes, typically consisting of a single volatile substance such as citronellol as they are simply not capable to consistently deliver a more sophisticated perfume as is increasingly desired by the modern perfume industry.

Thirdly pure polymeric materials are difficult to transform and generally require high temperatures to be molded. Therefore whenever a volatile material is introduced in the melt, a large amount of said material is lost due to the high temperature.

The first and second problems have been partially addressed by Firmenich in U.S. Pat. No. 4,734,278 which describes shaped bodies of block polyether-amide based resins (e.g. Pebax™) that provide sustained release of volatile actives (perfumes, deodorants, insecticides etc). An improvement has been obtained by Atochem who in WO 9726020A1 describe improved fragrant resins made by Pebax™+ a complex perfume (i.e. more than 5 components). Such resins are able to deliver a complex perfume with a reduced separation of the volatile ingredients over time.

The third problem has been partially solved by the use of plasticizers which, as it is well known to those skilled in the art, allow the reduction of the processing temperature of polymeric mixtures. This solution has been applied e.g. from Avon in U.S. Pat. No. 4,552,693 which describes transparent fragrance-emitting articles obtained from compositions comprising a thermoplastic polyamide resin, a plasticizer/solvent system comprising a sulfonamide plasticizer, and a fragrance. The advantage of using a plasticizer in these compositions is the possibility of processing said compositions (molding, extruding, filming) at relatively low temperatures.

However prior art compositions are still not completely satisfactory as they still have a tendency to release a greater amount of the volatile ingredient at the first moment and to decrease the release rate with time. Also, although improved in comparison with previous compositions, they still do not release uniformly different components of the volatile material which have different volatilities. Therefore there is still a need for a polymeric material which is able to incorporate and sustainedly release volatile materials which are composed by several ingredients of different volatility for a long time and without separation of said ingredients during the release, and is also capable of being easily processed and formed into an article.

SUMMARY OF THE INVENTION

The present invention relates to a polymeric composition comprising:
a) a copolymer obtained from at least one monomer comprising an ether group and at least one monomer not comprising an ether group,
b) a compatible plasticizer,
c) a volatile material.

DETAILED DESCRIPTION OF THE INVENTION

It was surprisingly found that a composition comprising a) a copolymer obtained from at least one monomer comprising an ether group and at least one monomer not comprising an ether group b) a compatible plasticizer and c) a volatile material, has the ability of releasing said volatile material for a long time in a more sustained manner, i.e. with a more constant release rate and for a longer period of time when compared with prior art solutions.

Another surprising benefit provided by the polymeric compositions of the present invention is that when said volatile material is comprised by several components of different volatility, the compositions of the present invention allow a more uniform release of all components of the volatile material over a long period of time avoiding separation of the components based on their different volatility. This can be seen for example in Example 6 reported below.

Another very important benefit provided by the polymeric compositions of the present invention is the possibility to introduce a much wider range of volatile materials.

Prior art solutions described polymeric compositions based on specific polymers like polyether-polyamide block copolymers or pure polyamide polymers. As a consequence the choice of the volatile material was limited to those ingredients which were soluble or compatible with that specific polymer.

It has been surprisingly found that polymeric compositions according to the present invention, comprising a copolymer obtained from at least one monomer comprising an ether group and at least one monomer not comprising an ether group, and a compatible plasticizer, can incorporate and effectively deliver a much larger number of volatile materials in a broader polarity range than the same pure copolymer.

Differently from prior art, the compositions of the present invention are much more flexible in terms of the compositions of the volatile material which can be delivered, since the formulator can choose the copolymer among all copolymers obtained from at least one monomer comprising an ether group and at least one monomer not comprising an ether group, additionally the plasticizer can be selected among a wide range of suitable materials of different polarity and behavior. Also, a number of additives can be introduced into the formulation as explained in detail below. Such a formulation flexibility for the plasticized polymeric matrix (copolymer, plasticizer, optionally other polymers or additives) allows the tuning of its polarity characteristics very precisely. This makes it possible to maximize the compatibility with any volatile material which could be introduced in the plasticized polymeric matrix thus obtaining a polymeric composition according to the present invention. Without being bound to any theory, it is believed that a certain polarity match between the plasticized polymeric matrix and the volatile material is required to provide good incorporation and sustained delivery of the volatile material.

Hence the copolymer and the compatible plasticizer of the polymeric compositions of the present invention can be selected such that the polarity of the plasticized polymeric matrix substantially matches the polarity of the volatile material, wherein the polarities can be evaluated with one of the methods known in the art.

All copolymers obtained from at least one monomer comprising an ether group and at least one monomer not comprising an ether group are suitable for the present invention.

The term "monomer comprising an ether group" includes all those monomers wherein at least an oxygen atom is bonded to two different carbon atoms none of which is connected to another oxygen atom, including those where the oxygen atom is included in a cyclic epoxide structure such as for example ethylene oxide, propylene oxide, tetramethylene oxide and the like. The term "monomer comprising an ether group" also includes those molecules, oligomers or polymers which contain an ether group inside the molecule and might be further polymerized.

In most cases said copolymers will comprise a polyether group and a non polyether group. Such copolymers can be both block and non-block copolymers, also copolymers formed by the grafting of polyether groups onto polymer structures, copolymers where the polyether group is comprised in a side chain or in a crosslink and copolymers where ether monomers are randomly copolymerized with non-ether monomers are suitable copolymers for the present invention. Among preferred copolymers obtained from at least one monomer comprising an ether group and at least one monomer not comprising an ether group which are suitable for the present invention are, for example, polyether amide copolymers, polyether ester copolymers, polyether urethanes, sulfonated polyether ester copolymers, polyether ester amide copolymers, copolymers formed by the polymerisation of polyether acrylates with other acrylic monomers/oligomers, etc Wherein a polyether group is present, preferred polyether groups are those with monomers which contain more than 2 carbon atoms, more preferred are those with monomers which contain more than 3 carbon atoms. Most preferred polyether containing groups are polypropylene glycol and, even more preferred, polytetramethylene glycol.

The monomer comprising an ether group in the copolymers suitable for the present invention represents at least 5% of the total weight of the copolymer, preferably at least 10% more preferably at least 15%.

Preferred copolymers for the present invention are polyether-amide block copolymers (e.g. Pebax™), poly-ether-ester-amide block copolymers, polyether polyester block copolymers (e.g. Hytrel™), polyurethane copolymers containing polyether blocks (e.g. Estane™) or mixtures thereof. Among the various copolymers of this type are preferred those which have a preferred polyether group as mentioned above. Therefore most preferred copolymers are those in which the polyether group is a polypropylene glycol or a polytetramethylene glycol.

The second essential component in the polymeric matrix of the polymeric compositions of the present invention is a plasticizer, compatible with the copolymer obtained from at least one monomer comprising an ether group and at least one monomer not comprising an ether group.

Suitable plasticizers for use in the polymeric compositions according to the present invention include citric acid esters, low molecular weight polyesters, polyethers, liquid rosin esters, aromatic sulfonamides, phthalates, benzoates, sucrose esters, derivatives of polyfunctional alcohols (where polyfunctional means having 2 or more hydroxyl groups), adipates, tartrates, sebacates, esters of phosphoric acid, fatty acids and diacids, fatty alcohols and diols, epoxidised vegetable oils etc, and mixtures thereof. As already mentioned above, the different polarity of the different compatible plasticizers (measurable with any method known to those skilled in the art, for example water/octanol partition coefficient) can be used to tune the polarity of the polymeric matrix in order to provide a better match with the polarity of the volatile material.

The third essential component of the present invention is a volatile material which is incorporated and then sustainedly delivered by the compositions of the present invention.

Volatile materials which can be used in the present invention are for example flavors, deodorants, insecticides, pheromones, aromas, repelling agents and most advantageously, perfumes.

The benefits provided by the present invention are particularly relevant when the volatile material is a perfume. Perfumes are typically composed of many components of different volatility. The present invention, avoiding separation of the components based on their different volatility, allows the sustained delivery of the full perfume bouquet for a long time. In a preferred embodiment of the present invention the volatile material is a perfume which is preferably composed by a plurality of components, more preferably by more than 5 components.

As used herein the term perfume means any odoriferous material. In general, such materials are characterised by a vapour pressure less than atmospheric pressure at room temperatures. The perfumes employed herein will most often be liquid at room temperatures, but also can be solid such as the various camphoraceous perfumes known in the art. A wide variety of chemicals are known for perfumery uses, including materials such as aldehydes, ketones, esters, alcohols, terpenes and the like. Naturally occurring plant and animal oils and exudates comprising complex mixtures of various chemical components are known for use as perfumes, and such materials can be used herein. The perfumes herein can be relatively simple in their composition or can comprise highly sophisticated, complex mixtures of natural and synthetic chemical components, all chosen to provide any desired odor.

Typical perfumes which can be used in the present invention comprise, for example, woody/earthy bases containing exotic materials such as sandalwood oil, civet, patchouli oil and the like. Other suitable perfumes are for example light, floral fragrances, e.g., rose extract, violet extract and the like. Perfumes can be formulated to provide desirable fruity odours, e.g., lime, lemon, orange and the like.

In short, any chemically compatible material which emanates a pleasant or otherwise desirable odour can be used as a perfume in the present invention.

Perfume materials are described more fully in S. Arctander, Perfume Flavors and Chemicals. Vols. I and II. Aurthor, Montclair, N.J., and the Merck Index, 8th Edition, Merck & Co., Inc. Rahway, N.J.

Preferably the volatile material of the present invention is introduced in the polymeric composition in a form which does not prevent the chemicals which constitute said volatile material from being to be chemically dissolved in the plasticized polymeric matrix. In particular encapsulated volatile materials and chemicals which comprise volatile species covalently bonded to a non volatile one (e.g. pro-perfumes), are not recommended and preferably excluded for use herein as volatile materials according to the present invention. Without being bound to any theory, it is believed that the advantageous properties of the polymeric compositions of the present invention can be seen when the volatile material is solubilized in the plasticized polymeric matrix, as the volatile material release is linked to molecular level interaction between the volatile material and the plasticized polymer matrix. Therefore systems such as encapsulation, which prevent the volatile material from mixing at molecular level with the polymeric matrix, are not preferred for use as volatile materials in the present invention, and are preferably excluded.

Preferably the polymeric composition of the present invention comprises from 5% to 75%, more preferably from 10% to 50% by weight of the polymeric composition, of the copolymer obtained from at least one monomer comprising an ether group and at least one monomer not comprising an ether group; from 5% to 60%, preferably from 10% to 40% by weight of the polymeric composition, of the suitable plasticizer or blend of plasticizers, and more than 10%, preferably more than 20%, more preferably more than 30% of a volatile material; the volatile material is preferably comprised up to a maximum percentage of 90% by weight of the polymeric composition.

The polymeric compositions of the present invention may in addition comprise additional optional components to further improve the processability of the compositions and also the mechanical characteristics as well as other characteristics as tackiness, resistance to ageing by light, oxygen and heat, visual appearance etc., of the objects formed from such polymeric compositions.

Such optional components include other copolymers that can be included in the formulations to improve their properties for example to increase adhesion or compatibility with substrates. To this purpose preferred optional copolymers are those featuring both polar and non-polar groups, for example: copolymers of ethylene and at least one other vinyl or acrylic monomer, copolymers of styrene and at least one other vinyl or acrylic monomer, copolymers of poly(vinyl alcohol), polyamides, copolymers of poly(vinyl pyrrolidone), polyacrylates, copolymers of polyvinyl ethers ), ionomers, polyester amide copolymers, etc.

The polymeric compositions of the present invention preferably are thermoplastic polymeric compositions. These can be manufactured by using any known process for manufacturing thermoplastic polymeric compositions and will typically comprise the steps of melting the polymer and then blending the plasticizer and the volatile material to form a homogeneous mass that is then cooled to obtain the polymeric composition according to the present invention. Among thermoplastic compositions preferred are those which have low melt temperature and viscosity and therefore are processable as hot melts. In these systems the loss of volatile material upon blending is minimized.

Other optional components which can be preferably used when the polymeric composition according to the present invention is a thermoplastic composition and preferably has a hot melt rheology are tackifying resins such as rosin derivatives, aliphatic resins, aromatic resins or mixed aliphatic-aromatic resins. The composition can be then formulated in order to also have the characteristics of a hot melt adhesive, in addition to the capability of releasing volatile materials. Further optional ingredients such as other polymers or copolymers, fillers, crosslinkers, pigments, dyes, antioxidants and other stabilizers, etc can also be added to provide desired properties to the composition.

The polymeric compositions of the present invention may also be prepared using a polymer solution, either as an intermediate or final step. Preparations of this type are well known to those skilled in the art and typically will comprise the steps of dissolving the selected polymer, plasticiser and volatile material in an effective solvent, and heating if necessary to prepare a solution or a gel. The solvent can then be eliminated by evaporation.

Alternatively, the polymeric compositions of the present invention can be prepared in the form of an aqueous emulsion or dispersion.

The techniques for obtaining aqueous emulsions or dispersions of polymers are well known to the skilled man. For example, the selected polymer, plasticiser and volatile material can be blended together as a thermoplastic material. The resulting melt can then be dispersed in water, preferably at a temperature above its melting point, by mixing. Surfactant and/or stabilizing systems known to those skilled in the art can be employed to stabilize the resultant emulsion or dispersion.

Alternatively, a preformed aqueous polymeric dispersion or emulsion can be blended with the selected plasticiser and volatile material. This can be done by adding the ingredients directly to the polymeric dispersion or emulsion, or by forming an aqueous dispersion of the perfume and plasticiser and blending this with the polymeric dispersion or emulsion. Both procedures result in the formation of an aqueous dispersion of a polymeric composition according to the present invention.

Polymeric compositions according to the present invention may have different applications whenever the release of a volatile material is desired. For example they can be used in air-freshening devices (room-fresheners, car fresheners, toilet rim-blocks etc.), perfumed headspace delivery in packages such as bottles, boxes, bags, etc., cleaning/drying systems (tumble dryers, dishwashers, dry cleaning systems etc.), laundry detergents, fabric conditioners, home care products, personal care products (deodorants, anti-perspirants, shampoos, conditioners, cosmetics, skin moisturizers, makeups etc.), fine fragrances, scented coatings, films, laminates, hygienic articles (fem-care pads, panty liners, diapers, shoe insoles, etc.), scented inks, scented three dimensional objects, disinfectants delivery, insecticides delivery, insect repellants delivery, flavor delivery etc.

EXAMPLES

Example 1

24.5 parts of Pebax™ 2533, a polyether amide copolymer available from Atofina (France), 12.5 parts of Foralyn™ 5020F, a rosin ester plasticiser available from Eastman Chemical and 0.5 parts of Irganox™ B225, an antioxidant available from Ciba Geigy (Switzerland) were added to a sigma blade mixer and heated to a temperature of about 10–20° C. above the melting point of the polymer (about 160° C. for Pebax™ 2533). The ingredients were mixed until a homogeneous mass was obtained. The temperature was then reduced to a point where the mixture was still molten, typically to about 10–20° C. above the melting point of the mixture (about 120° C. in the present case). 12.5 parts of Foralyn 5020F was blended with 25 parts of gamma methyl ionone, a perfume material available from International Flavors & Fragrances, and this blend was added to the plasticised polymer mixture. The ingredients were mixed until a homogeneous mixture was obtained, and the resultant material was then removed from the mixer, formed as a perfuming block and cooled to room temperature.

In all following examples the same preparation procedure has been followed and, in particular, in all cases 50% of the total amount of plasticizer is blended with the polymer and other additives in a first step, then the remaining 50% of the total amount of plasticizer is blended with the volatile material (e.g. the perfume) in a second step and then the two blends are mixed in a third step.

Example 2

Following the procedure outlined in Example 1, the following plasticised polymeric composition was prepared:

| Component | Parts |
| --- | --- |
| Pebax ™ 2533 | 34.5 |
| Foralyn ™ 5020F | 35 |
| Benzyl Acetate | 30 |
| Irganox ™ B225 | 0.5 |

Benzyl acetate is a perfume material available from Sigma Aldrich.

Example 3

Following the procedure outlined in Example 1, the following plasticised polymeric composition was prepared:

| Component | Parts |
| --- | --- |
| Estane ™ 58280 | 24.5 |
| Dipropylene glycol dibenzoate | 25 |
| Cis-3-Hexenyl Salicylate | 50 |
| Irganox ™ B225 | 0.5 |

Estane™ 58280 is a polyether urethane available from Noveon. Dipropylene glycol dibenzoate is a benzoate plasticiser available from Velsicol under the trade name Benzoflex™ 988. Cis-3-Hexenyl Salicylate is a perfume material available from International Flavors & Fragrances.

Example 4

Following the procedure outlined in Example 1, the following plasticised polymeric composition was prepared:

| Component | Parts |
| --- | --- |
| Estane ™ 58280 | 9.5 |
| Dipropylene glycol dibenzoate | 20 |
| Spring Fresh ™ | 70 |
| Irganox ™ B225 | 0.5 |

Spring Fresh is a perfume blend available from Givaudan (France).

Example 5

15 parts of Benzyl acetate were blended with 15 parts of acetyl tributyl citrate, a citrate plasticiser available from Jungbunzlauer (Switzerland) under the trade name Citrofol™ BII. This liquid was then added to 70 parts of deionised water and then subjected to high shear mixing using an Ultra Turrax T50 Basic mixer, available from Ika Werke (Germany). An opaque white dispersion (30% solids) was obtained. This was then added to 100 parts of Rolflex™ C89, a 30% solids water dispersion of a polyether urethane available from Cesalpinia (Italy). The mixture was allowed to stir for 24 hours, resulting in a plasticised polymeric dispersion with the following compositions in weight %.

| Component | Parts |
| --- | --- |
| Rolflex C89 | 15 |
| Acetyl Tributyl Citrate | 7.5 |
| Benzyl Acetate | 7.5 |
| Water | 70 |

Example 6

Six polymeric compositions comprising a pure perfume material (i.e. a simple perfume comprising only one volatile component) were prepared. Formulations B, D and F were prepared according to the present invention, following the method outlined in Example 1. Formulations A, C and E were based on prior art technology (pure polymer without plasticizer); the polymer was heated to about 160° C. and the perfume was added gradually until a homogeneous mixture was obtained, then the mixture was cooled to room temperature. The pure perfume raw materials used were D-Limonene, available from Sigma Aldrich, cis-3-Hexenyl acetate, available from Givaudan, and methyl dihydrojasmonate, available from Firmenich. Table 2 shows physical data for the three pure perfume materials: D-limonene and cis-3-hexenyl acetate have relatively low boiling points for perfume materials and are recognized in the industry as being among the more volatile perfume ingredients; methyl dihydrojasmonate has a higher boiling point and is recognized as being a less volatile ingredient.

The weight loss over time of the different formulations was measured by Thermogravimetric Analysis (TGA). The instrument used was a TGA Q500 from TA-Waters. A constant nitrogen flow was applied over the crucible (no equilibrium). The following conditions were used:

Cycle Time: 360 minutes
Temperature: 37° C.
Crucible: Alumina, 4.55 mm diameter, 3.9 mm height The weight loss after 360 minutes was measured for each sample. This is taken as the evaporation of the perfume, this being the only volatile material present in the formulation. The results are illustrated in Table 1.

TABLE 1

| Material | A | B | C | D | E | F |
|---|---|---|---|---|---|---|
| Pebax 2533 | 50 | 25 | 50 | 25 | 50 | 25 |
| Foralyn 5020F |  | 25 |  | 25 |  | 25 |
| D-Limonene | 50 | 50 |  |  |  |  |
| Cis-3-Hexenyl acetate |  |  | 50 | 50 |  |  |
| Methyl dihydrojasmonate |  |  |  |  | 50 | 50 |
| Weight Loss after 360 minutes @ 37° C. (%) | 24 | 9 | 19 | 12 | 0.2 | 0.2 |

The thermogravimetric results show how a polymeric composition according to the present invention, if compared with the same pure polymer, provides a slower and therefore longer lasting release of a volatile perfume ingredient. The example also shows how the release of a perfume ingredient of lower volatility is not reduced when incorporated into compositions according to the present invention. Therefore, the difference in the release rate of a volatile perfume ingredient and of a non volatile one, is much smaller when the perfume is incorporated into polymeric compositions according to the present invention. It is now clear to the skilled man that this fact, when considering complex perfumes, composed by many ingredients of different volatility, leads to a longer lasting and better delivery of the full perfume character.

TABLE 2

| Perfume | M.W. | Boiling Point (° C.) |
|---|---|---|
| D-limonene | 136 | 178 |
| Cis-3-Hexenyl acetate | 142 | 179 |
| Methyl dihydrojasmonate | 220 | 314 |

What is claimed is:

1. A polymeric composition comprising:
   a) a copolymer comprising at least one ether-substituted monomer and at least one non-ether substituted monomer;
   b) a compatible plasticizer; and,
   c) a volatile material;
   wherein said ether-substituted monomer comprises at least 5% of the total weight of said copolymer, and wherein said copolymer comprises from 5% to 75% by weight of said polymeric composition, the compatible plasticizer ranges from 5% to 60% by weight of the polymeric composition, and said volatile material comprises more than 10% of the total weight of the composition.

2. The polymeric composition of claim 1, wherein said copolymer is a block copolymer, said block copolymer comprising at least a polyether block and at least one non-polyether block.

3. The polymeric composition of claim 2, wherein said polyether block comprises a polytetramethylene glycol group.

4. The polymeric composition of claim 1, wherein said volatile material comprises less than 90% of the total weight of said composition.

5. The polymeric composition of claim 1, wherein said volatile material is a perfume.

6. The polymeric composition of claim 5, wherein said perfume comprises a compound selected from the group consisting of aldehydes, ketones, alcohols, terpenes, esters, and combinations thereof.

7. The polymeric composition of claim 1, wherein said copolymer is selected from the group consisting of polyether amide copolymers, polyether ester copolymers, polyether urethanes, sulfonated polyether ester copolymers, polyether ester amide copolymers, and combinations thereof.

8. The polymeric composition of claim 1, wherein said compatible plasticizer is selected from the group consisting of citric acid esters, low molecular weight polyesters, polyethers, rosin esters, aromatic sulfonamides, phthalates, benzoates, sucrose esters, adipates, tartrates, sebacates, esters of phosphoric acid, fatty acids and diacids, fatty alcohols and diols, epoxidised vegetable oils, and mixtures thereof.

* * * * *